# (12) United States Patent
Yamashita et al.

(10) Patent No.: US 9,112,441 B2
(45) Date of Patent: Aug. 18, 2015

(54) TURBO CHARGER GENERATOR

(75) Inventors: Yukio Yamashita, Tokyo (JP); Keiichi Shiraishi, Tokyo (JP); Yoshihisa Ono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 13/807,075

(22) PCT Filed: Dec. 22, 2011

(86) PCT No.: PCT/JP2011/079794
§ 371 (c)(1),
(2), (4) Date: Dec. 27, 2012

(87) PCT Pub. No.: WO2012/090854
PCT Pub. Date: Jul. 5, 2012

(65) Prior Publication Data
US 2013/0106368 A1 May 2, 2013

(30) Foreign Application Priority Data

Dec. 27, 2010 (JP) ................................. 2010-291366

(51) Int. Cl.
*H02P 9/48* (2006.01)
*H02P 9/04* (2006.01)
(Continued)

(52) U.S. Cl.
CPC .. *H02P 9/48* (2013.01); *F01N 5/04* (2013.01); *F02B 37/00* (2013.01); *F02D 29/06* (2013.01); *H02P 9/04* (2013.01); *F02B 63/042* (2013.01); *Y02T 10/144* (2013.01); *Y02T 10/16* (2013.01)

(58) Field of Classification Search
CPC .......... H02P 9/48; H02P 9/305; Y02E 10/725

USPC ............................................................ 322/89
See application file for complete search history.

(56) References Cited

U.S. PATENT DOCUMENTS

| 7,969,044 B2 * | 6/2011 | Armstrong et al. ............. 307/86 |
| 2007/0216452 A1 * | 9/2007 | Matsumoto et al. .......... 327/116 |

(Continued)

FOREIGN PATENT DOCUMENTS

| JP | 58-217743 | 12/1983 |
| JP | 3-32400 | 2/1991 |

(Continued)

OTHER PUBLICATIONS

International Search Report issued Mar. 27, 2012 in International (PCT) Application No. PCT/JP2011/079794.

(Continued)

*Primary Examiner* — Julio Gonzalez
*Assistant Examiner* — Sean Gugger
(74) *Attorney, Agent, or Firm* — Wenderoth, Lind & Ponack, L.L.P.

(57) ABSTRACT

A turbo charger generator (1) generates power with a generator (7) by driving a gas turbine (3) and a compressor (6) with exhaust gas from an internal combustion engine (2). The generated AC power is supplied to an electric power system (12) via a power conversion unit (8). The power conversion unit (8) has a converter (13) for converting AC power into DC power, a unit (18) for estimating a rotor rotation angle θ based on a rotor magnetic flux, and a control unit (15) for coordinate-converting AC current into DC current by using the rotor rotation angle θ as the reference, and controlling the output DC power of the converter (13) such that the magnitude of the DC current is maintained at a target DC current value.

4 Claims, 3 Drawing Sheets

(51) Int. Cl.
*F01N 5/04* (2006.01)
*F02B 37/00* (2006.01)
*F02D 29/06* (2006.01)
*F02B 63/04* (2006.01)

(56) References Cited

U.S. PATENT DOCUMENTS

2007/0277514 A1* 12/2007 Kammel .................. 60/302
2008/0150470 A1* 6/2008 Yasui et al. ............. 318/717
2009/0079195 A1* 3/2009 Ito et al. .................. 290/44

FOREIGN PATENT DOCUMENTS

| JP | 5-44518 | 2/1993 |
| JP | 2002-206430 | 7/2002 |
| JP | 2003-111499 | 4/2003 |
| JP | 2007-303417 | 11/2007 |
| JP | 2008-62722 | 3/2008 |
| JP | 2008-286016 | 11/2008 |
| JP | 4487092 | 6/2010 |

OTHER PUBLICATIONS

Notice of Allowance issued Mar. 24, 2014 in corresponding Korean application No. 10-2012-7033772 (with English translation).
Decision of Refusal mailed May 7, 2013 in corresponding Japanese Application No. 2010-291366 (with English translation).
International Preliminary Report on Patentability and Written Opinion of the International Searching Authority issued Jul. 2, 2013 in corresponding International Application No. PCT/JP2011/079794 (with English translation).
Office Action issued Sep. 12, 2014 in corresponding Chinese patent application No. 201180023836.8 (with English translation).
Decision to Grant a Patent issued Jan. 6, 2015 in corresponding Japanese patent application No. 2013-162823 (with English translation).

* cited by examiner

TURBO CHARGER GENERATOR

BACKGROUND OF THE INVENTION

1. Technical Field

This invention relates to the technical field of a turbo charger generator configured to supply compressed intake air to an internal combustion engine by driving a gas turbine and a compressor with exhaust gas discharged from the internal combustion engine, and to supply AC power generated by driving a generator connected to an end of a shaft of the compressor to an electric power system via a power conversion unit.

2. Description of the Related Art

There are known turbo charger generators, for example, which are devised to improve the output of an internal combustion engine by supplying compressed intake air to the internal combustion engine by driving a gas turbine and a compressor with exhaust gas discharged from the internal combustion engine, and to generate power by means of a generator using excess energy left from the driving of the compressor. The power output from the generator varies according to an operating condition (e.g. energy of the exhaust gas) of the internal combustion engine. Therefore, the power generated by the generator is converted into an appropriate frequency and voltage with a power conversion unit that is an inverter or the like before being supplied to the electric power system.

In a turbo charger generator disclosed in Japanese Patent Application Publication No. 2008-286016, a rotating speed of the generator is maintained at an appropriate value by feedback controlling the rotating speed of the generator based on a detection value. This patent document claims that the generator is able to perform efficient power generation by utilizing excess energy while improving the intake pressure generated by the turbo charger.

Patent Document 1: Japanese Patent Application Publication No. 2008-286016

JP 2008-286016 intends to control the output power by maintaining the rotating speed of the generator at a predetermined value. However, in an internal combustion engine, the engine speed at which the internal combustion engine can operate efficiently (optimum engine speed) varies as the load varies. Therefore, when the engine speed is controlled so as to be maintained at a predetermined value like in JP 2008-286016, the engine speed will differ from the optimum engine speed, leading to degradation in use efficiency of energy. Consequently, the technique of JP 2008-286016, which controls the output power based on engine speed, has the drawback that good load followability cannot be obtained when the load varies.

Further, when as in the case of a vessel, a plurality of generators are provided, and one or some of those generators is/are turbo charger generator(s), the power supplied to an electric power system must be adjusted by establishing coordination between the turbo charger generator(s) and the other generator(s) (by controlling the power generated by the turbo charger generator(s) and the power generated by the other generator(s) so that the total generation of power does not become excessively large). However, no consideration is given in JP 2008-286016 to control of power generation under such coordination control. In particular, since good followability cannot be obtained when the load varies, as described above, a protection circuit must be provided so that it is activated when excessive power is supplied to the electric power system. Thus, the technique of Patent Document 1 has a problem that the general configuration becomes complicated.

Furthermore, according to JP 2008-286016, the rotating speed is detected based on an output voltage waveform of an electric motor. However, the voltage amplitude is very small when the generator is rotating at a low speed, and the detection is difficult. This causes a problem that it is difficult to ensure a high control accuracy during low-speed operation of the generator particularly when the electric power system is synchronously operated.

Still further, in JP 2008-286016, a speed detector or a frequency detection unit must be provided in order to detect a rotating speed of the generator. This complicates the detection equipment and the control circuit, and makes it difficult to embody the technique.

SUMMARY OF THE INVENTION

This invention has been made in view of the problems as described above, and an object of the invention is to provide a turbo charger generator which has good followability to load fluctuation of an internal combustion engine, and is capable of generating electric power efficiently and stably.

The invention provides a turbo charger generator for supplying compressed intake air to an internal combustion engine by driving a gas turbine and a compressor with exhaust gas discharged from the internal combustion engine, and for supplying AC power generated by driving a generator connected to an end of a shaft of the compressor to an electric power system via a power conversion unit. The turbo charger generator according to the invention is characterized in that the power conversion unit includes: a converter for converting the AC power generated by the generator into DC power and outputting the DC power; a rotor rotation angle estimation unit for estimating an angle of rotation of a rotor of the generator based on a rotor magnetic flux of the generator; and a control unit for coordinate-converting AC current output from the generator into DC current by using the estimated rotor rotation angle as a reference, and controlling the DC power output from the converter such that the magnitude of the DC current is maintained at a target DC current value that is set based on an output DC voltage value of the converter.

According to the invention, AC current fluctuating from moment to moment can be feedback controlled by coordinate-converting the AC current output from the generator into DC current, using as the reference a rotor rotation angle that is estimated based on the rotor magnetic flux of the generator. This control is performed such that the magnitude of the coordinate-converted DC current is maintained at a target DC current value that is set based on an output DC voltage value of the converter. This makes it possible to stabilize the output power of the converter and to ensure favorable followability even if load fluctuation occurs.

In particular, the target DC current value is set such that the output DC voltage value of the converter is maintained at a preset target DC voltage value. In this case, the output power can be controlled such that the output DC voltage value of the converter can be maintained at a DC voltage value that is suitable for the electric power system and the interconnection inverter.

Preferably, the rotor rotation angle estimation unit may calculate the rotor magnetic flux based on an output AC current of the generator. In this case, the rotor rotation angle can be calculated with a high degree of accuracy based on circuit constants (e.g. inductance and resistance values) of the output AC current of the electric motor.

Further, the converter may include a switching unit for short-circuiting an output terminal of the generator, and the control unit may short-circuit the output terminal of the generator for a predetermined time period by driving the switching unit upon starting synchronous operation of the generator. Although the rotor magnetic flux cannot be calculated since no generator current is flowing before the generator is synchronously operated by the converter, the rotor rotation angle can be calculated with a high degree of accuracy by short-circuiting the output terminal of the generator.

According to the invention, AC current fluctuating from moment to moment can be feedback controlled by coordinate-converting the AC current output from the generator into DC current, using as the reference a rotor rotation angle that is estimated based on the rotor magnetic flux of the generator. This control is performed such that the magnitude of the coordinate-converted DC current is maintained at a target DC current value that is set based on an output DC voltage value of the converter. This makes it possible to stabilize the output power of the converter and to ensure favorable followability even if load fluctuation occurs.

DETAILED DESCRIPTION OF THE INVENTION

Preferred embodiments of the invention will be described in detail with reference to the accompanying drawings. It should be understood that in these embodiments, sizes, materials, shapes, and relative arrangement of parts and components are described by way of example only, and are not meant to limit the scope of the invention unless otherwise specified.

First Embodiment

Figure 1:
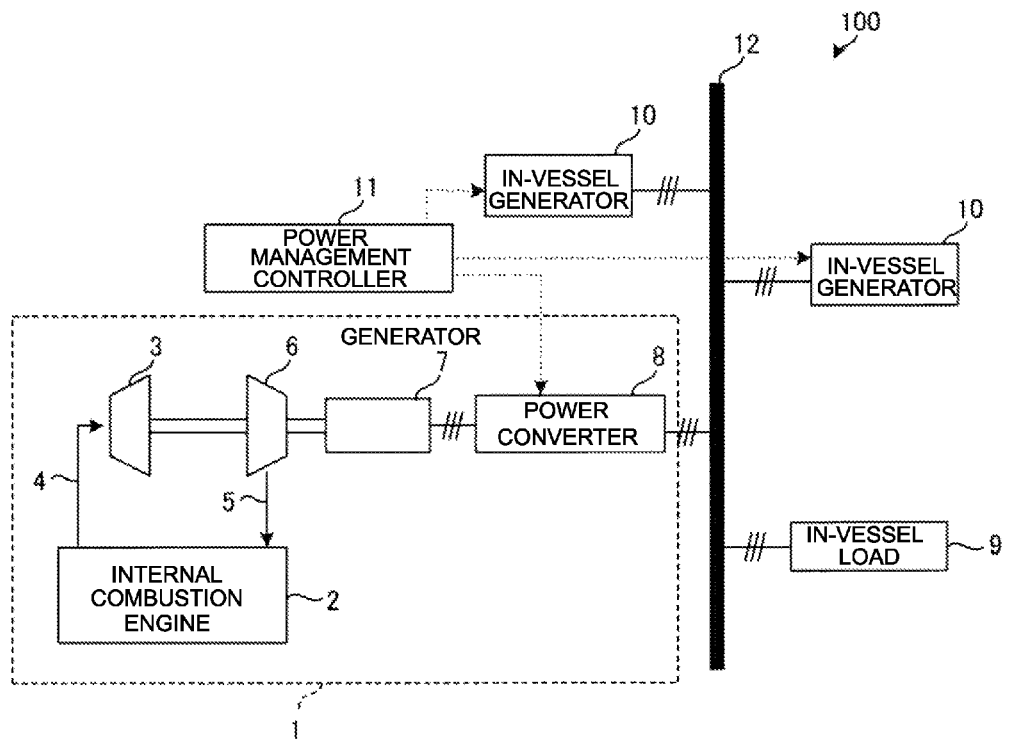
FIG. 1 is a block diagram showing a general configuration of a vessel equipped with a turbo charger generator according to a first embodiment.

Description of this embodiment will be made, taking as an example a vessel 100 equipped with a turbo charger generator 1 according to the invention. FIG. 1 is a block diagram showing a general configuration of a vessel 100 equipped with a turbo charger generator 1 according to a first embodiment. The turbo charger generator 1 has an internal combustion engine 2 as a power source for the vessel 100, and the internal combustion engine 2 is for example a diesel engine. Exhaust gas discharged from the internal combustion engine 2 is emitted outside through an exhaust gas passage 4 in which a gas turbine 3 is arranged. The gas turbine 3 is rotation-driven by the exhaust gas, and the energy of the exhaust gas is transformed into rotational energy of an output shaft of the gas turbine 3. The output shaft of the gas turbine 3 is connected to an input shaft of a compressor 6 which is arranged in an intake air passage 5 for introducing external air into the internal combustion engine 2. The compressor 6 is rotation-driven by the rotational energy transmitted from the output shaft of the gas turbine 3. The compressor 6 compresses the external air introduced from the intake air passage 5 and supplies the compressed air to the internal combustion engine 2.

The output shaft of the gas turbine 3 is connected to an input shaft of the generator 7, in addition to the input shaft of the compressor 6. The generator 7 is rotation-driven by rotational energy transmitted from the output shaft of the turbine 3 and generates electric power. In this manner, excess energy of the exhaust gas from the internal combustion engine 2 is collected as electric power so that the energy efficiency of the turbo charger generator 1 is improved.

While the generator 7 used in this embodiment is a permanent-magnet synchronous generator, a wound-field synchronous generator may be used instead.

AC power generated by the generator 7 has a predetermined frequency corresponding to an engine speed of the gas turbine 3. Therefore, the frequency of the AC power varies as the energy of the exhaust gas varies. For that reason, the frequency of the AC power generated by generator 7 is converted into an appropriate frequency by being input to the power converter 8 before it is supplied to the electric power system 12. The electric power system 12 is connected to an in-vessel load 9 that is electrical equipment such as lighting in the vessel, by which the generated power is consumed.

The electric power system 12 is connected to at least one of other in-vessel generators 10, in addition to the generator 7. A power management controller 11 is provided in order to control the output power of the generator 7 and that of the in-vessel generator 10. The power management controller 11 sends a command to the generator 7 and the in-vessel generator 10 to control the output power thereof.

Figure 2:
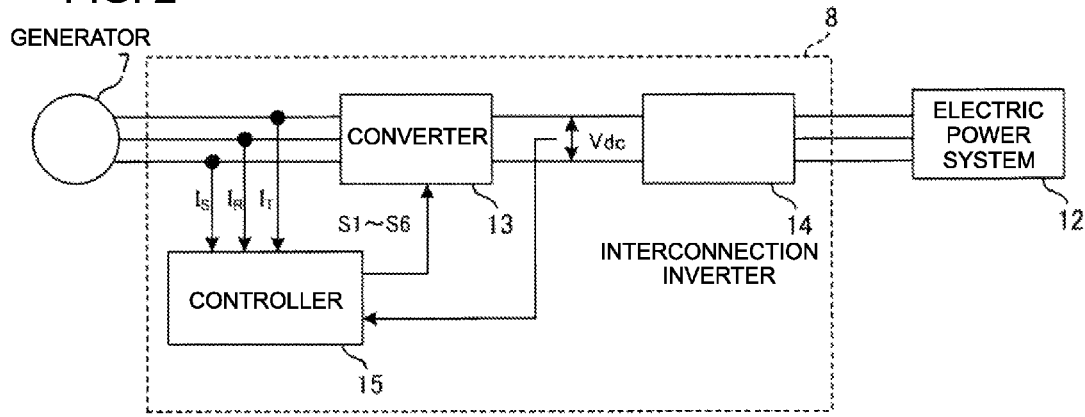
FIG. 2 is a block diagram showing an internal configuration of a power converter provided in the turbo charger generator according to the first embodiment.

Referring to FIG. 2, an internal configuration of the power converter 8 provided in the turbo charger generator 1 according to the first embodiment will be described specifically. FIG. 2 is a block diagram showing an internal configuration of the power converter 8 provided in the turbo charger generator 1 according to the first embodiment.

The power converter 8 includes a converter 13 that is a PWM rectifier, an interconnection inverter 14 that is a PWM inverter, and a controller 15 for controlling an output DC voltage $V_{dc}$ of the converter 13 by supplying PWM signals S1 to S6. In this embodiment, in particular, the AC power generated by the generator 7 is three-phase AC power, and the three-phase AC power input to the power converter 8 is once converted into DC power by the converter 13, and then again converted into AC power by being input to the interconnection inverter 14. In this manner, even if the AC power from the generator 7 fluctuates according to a drive state of the internal combustion engine, the generated power can be converted into an appropriate power value by the power converter 8 so that electric power appropriate for the in-vessel power load 9 can be obtained.

Figure 3:
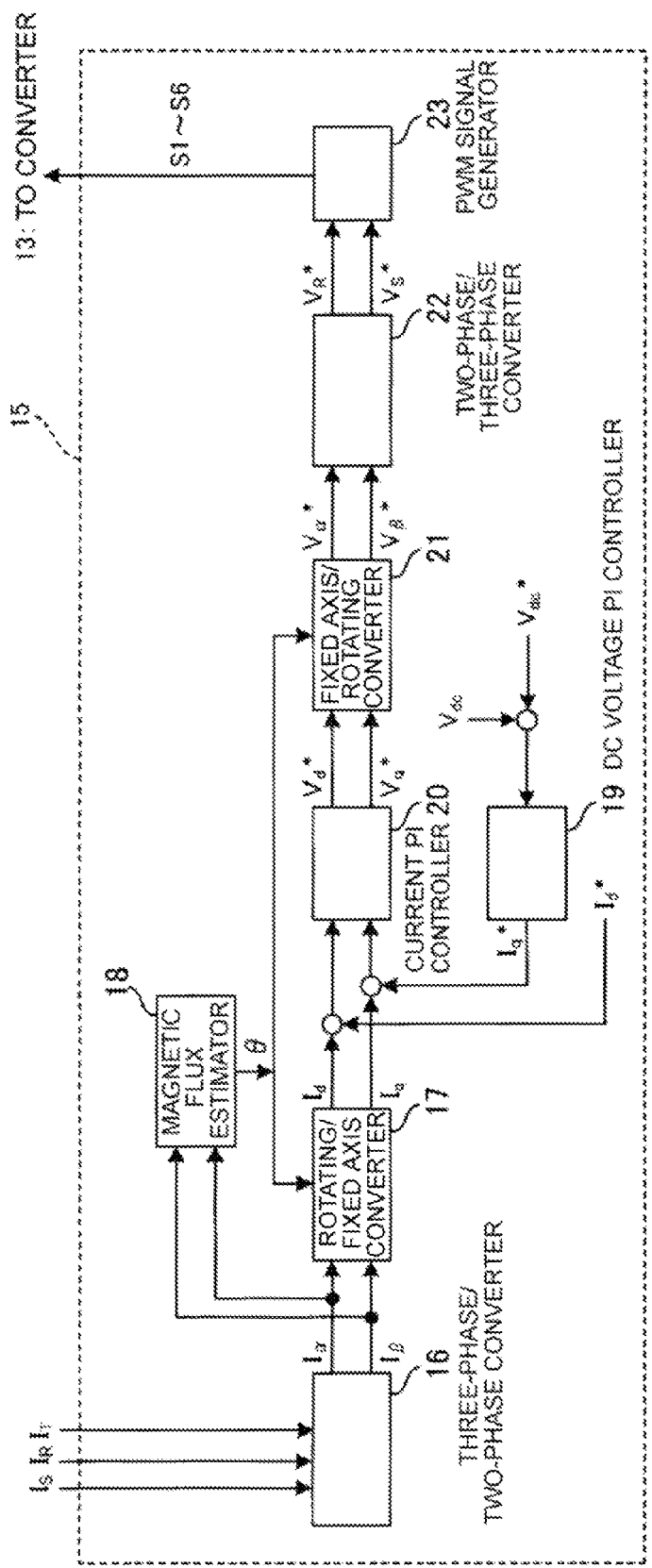
FIG. 3 is a block flow diagram showing a flow of operation of a controller of the power converter for each of circuit blocks.

FIG. 3 is a block flow diagram showing a flow of operation of the controller 15 of the power converter 8 for each of circuit blocks. The controller 15 acquires three-phase AC current values $I_R$, $I_S$ and $I_T$ output by the generator 7 and inputs them to a three-phase/two-phase converter 16. The power converter 8 may be configured to detect two AC current values $I_R$ and $I_S$ of three-phase (R-phase, S-phase and T-phase) AC power output from the generator 7 and to calculate the other AC current value $I_T$ based on the values $I_R$ and $I_S$.

The three-phase/two-phase converter 16 performs coordinate conversion based on one of the AC current values $I_R$, $I_S$ and $I_T$ so that the three-phase AC current values $I_R$, $I_S$ and $I_T$ are converted into two-phase ($\alpha$-phase and $\beta$-phase) AC current values $I_\alpha$ and $I_\beta$, and inputs them into a rotating/fixed axis converter 17. The description herein will be made on the assumption that the conversion into two phases has been done on the basis of the value $I_R$.

The rotating/fixed axis converter 17 further coordinate-converts the input AC current values $I_\alpha$ and $I_\beta$ based on a rotor rotation angle θ of the generator 7 into DC current values $I_d$ and $I_q$ corresponding to the d-axis and the q-axis. The rotor angle θ of the generator 7 is estimated based on a rotor magnetic flux calculated by a magnetic flux estimator 18. The magnetic flux estimator 18 obtains variables that are a cosine function and a sine function of a magnetic flux Φ, as represented by the equations below, based on the AC current values $I_\alpha$ and $I_\beta$, circuit constants (inductance and resistance) and output voltages $V_\alpha$ and $V_\beta$ of the converter.

$$\Phi \cos \theta = \int (V_\alpha - I_\alpha R) dt - LI_\alpha \quad (1)$$

$$\Phi \sin \theta = \int (V_\beta - I_\beta R) dt - LI_\beta \quad (2)$$

A frequency of variation of the variables Φ cos θ and Φ sin θ thus calculated is a product of a rotor rotational frequency multiplied by a number of pole pairs. Accordingly, rotor rotation angle θ can be estimated with a high accuracy by using a phase-locked loop.

A target value of $V_{dc}^*$ is preliminarily set for the output DC voltage $V_{dc}$ of the converter 13. The target value $V_{dc}^*$ is set, for example, to a value suitable for the interconnection inverter to match the output voltage to a system voltage. A DC voltage PI controller 19 outputs a target value $I_q^*$ of output DC current value $I_q$ of the rotating/fixed axis converter 17 based on an actual measurement value $V_{dc}$ and the target value $V_{dc}^*$. A specific circuit configuration of the DC voltage PI controller 19 may be such that the target value $I_q^*$ is obtained by obtaining a control error ε by subtracting the actual measurement value $V_{dc}$ from the target value $V_{dc}^*$ by means of a subtractor, and adding a term obtained by multiplying the control error ε by a proportional gain $K_P$ by means of a multiplier and a term obtained by multiplying the control error ε by a proportional gain $K_I$ by means of an integrator.

On the other hand, the target value $I_d^*$ for the output DC current value $I_d$ of the rotating/fixed axis converter 17 is set to a predetermined constant when a rotor generated magnetic flux is controlled to be low. Normally, the target value $I_d^*$ is often set to zero.

A current PI controller 20 outputs a target value $V_q^*$ corresponding to the q-axis of the output DC voltage $V_{dc}$ of the converter based on the output DC current value $I_q$ of the rotating/fixed axis converter 17 and the target value $I_q^*$ output from the DC voltage PI controller 19. The current PI controller 20 also outputs a target value $V_d^*$ corresponding to the d-axis of the output DC voltage $V_{dc}$ of the converter 13 based on the output DC current value $I_d$ of the rotating/fixed axis converter 17 and its target value $I_d^*$. A specific circuit configuration of the current PI controller 20 is the same as that of the DC voltage PI controller 19.

The target values $V_q^*$ and $V_d^*$ output from the current PI controller 20 are input to a fixed axis/rotating converter 21. In an opposite manner to the rotating/fixed axis converter 17, the fixed axis/rotating converter 21 coordinate-converts the input DC target values $V_q^*$ and $V_d^*$ into AC target values $V_\alpha^*$ and $V_\beta^*$ on the basis of the rotor angle θ obtained from the magnetic flux estimator 18, and outputs them to a two-phase/three-phase converter 22.

In an opposite manner to the three-phase/two-phase converter 16, the two-phase/three-phase converter 22 converts the input two-phase AC target values $V_\alpha^*$ and $V_\beta^*$ into three-phase AC target values $V_R^*$, $V_S^*$ and $V_T^*$, and inputs them to a PWM signal generator 23. The PWM signal generator 23 performs pulse width modulation (PWM) based on the input three-phase AC target values $V_R^*$, $V_S^*$ and $V_T^*$ generates control signals S1 to S6, and supplies them to the converter 13.

The converter 13 is controlled based on the control signals S1 to S6, whereby the output DC voltage $V_{dc}$ is controlled so as to be its target value $V_{dc}^*$. This makes it possible to keep the electric power supplied to the electric power system 12 at an appropriate value. Thus, even if the load of the internal combustion engine 2 fluctuates, the converter 13 is controlled to maintain the power value, whereby favorable followability can be obtained.

This embodiment is characterized by controlling the output power of the generator 7 as described above. Since a rotor rotation speed can be calculated from a rotor rotation angle θ estimated by the magnetic flux estimator 18, it is also possible to perform torque control by calculating a torque of the generator 7 based on this rotor rotation speed and the output power. In this case, even if a torque fluctuation occurs on the side of the in-vessel load 9, it is possible to control the turbo charger generator 1 to maintain the torque stably.

Second Embodiment

Figure 4:
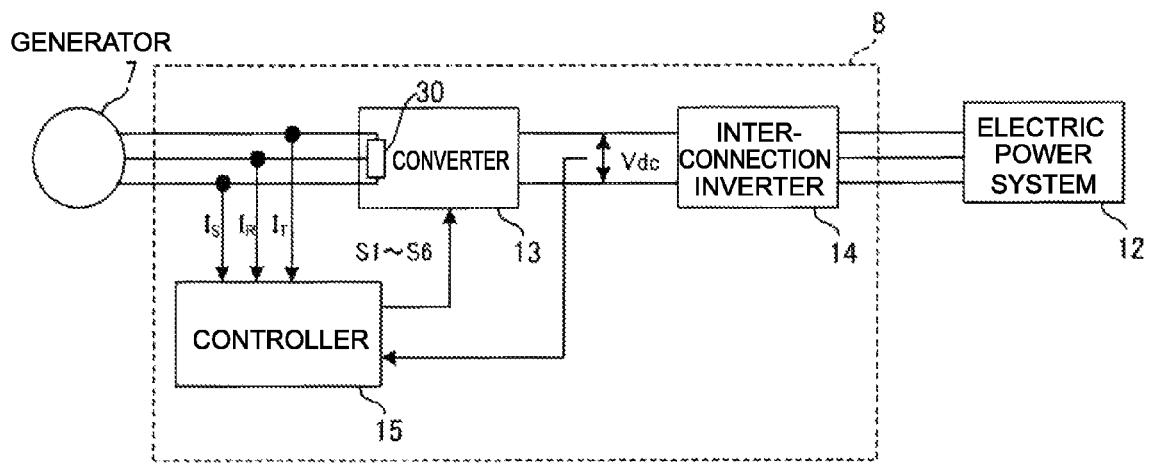
FIG. 4 is a block diagram showing an internal configuration of a power converter provided in a turbo charger generator according to a second embodiment.

Referring to FIG. 4, a turbo charger generator 1 according to a second embodiment will be described. In the description below, common components with the first embodiment are indicated by the same reference numerals and description thereof will be omitted as appropriate.

FIG. 4 is a block diagram showing an internal configuration of a power converter 8 provided in a turbo charger generator 1 according to this second embodiment. A semiconductor power switch 30 (such as a IGBT or FET) controlled by the control signals S1 to S6 is normally controlled so as not to short-circuit a generator output terminal. When the generator is to be synchronously operated, however, the rotor magnetic flux cannot be estimated since no current is flowing. Therefore, the control signals S1 to S6 are controlled so as to intentionally short-circuit the generator output terminal for a predetermined time within such a range that the current will not become excessively large.

In this manner, the rotor magnetic flux can be calculated with a high accuracy based on the AC current value even when the engine speed is relatively low before the generator 7 is synchronously operated, for example.

According to the second embodiment as described above, even when steady current is not flowing before synchronous operation, the accuracy of calculation of the rotor rotation angle can be improved by causing the semiconductor power switch 30 to short-circuit the output terminal of the generator 7 by the control signals S1 to S6. Thus, this embodiment is able to effectively solve the problem that the control accuracy cannot be ensured during low speed operation of the generator 7, such as when the generator 7 is synchronized with another in-vessel generator 10.

According to the invention as described above, AC current fluctuating from moment to moment can be feedback controlled by coordinate-converting the AC current output from the generator 7 into DC current, using as the reference a rotor rotation angle θ that is estimated based on the rotor magnetic flux of the generator 7. This control is performed such that the magnitude of the coordinate-converted DC current is maintained at a target DC current value that is set based on an output DC voltage value of the converter 13. This makes it possible to stabilize the output power of the converter 13 and to ensure favorable followability even if load fluctuation occurs.

The invention is applicable to a turbo charger generator that is configured to supply compressed intake air to an internal combustion engine by driving a gas turbine and a compressor with exhaust gas discharged from the internal combustion engine, and to supply AC power generated by driving a generator connected to an end of a shaft of the compressor to an electric power system via a power conversion unit.

The invention claimed is:

1. A turbo charger generator for supplying compressed intake air to an internal combustion engine by driving a gas turbine and a compressor with exhaust gas discharged from the internal combustion engine, and for supplying AC power generated by driving a generator connected to an end of a shaft of the compressor to an electric power system via a power conversion unit, wherein the power conversion unit comprises:
   a converter for converting the AC power generated by the generator into DC power and outputting the DC power;
   a rotor rotation angle estimation unit for estimating an angle of rotation of a rotor of the generator based on a rotor magnetic flux of the generator; and
   a control unit for coordinate-converting AC current output from the generator into DC current by using the estimated rotor rotation angle as a reference, and controlling the DC power output from the converter such that the magnitude of the DC current is maintained at a target DC current value that is set based on an output DC voltage value of the converter, wherein:
   the converter comprises a switching unit for short-circuiting an output terminal of the generator before starting synchronous operation of the generator; and
   the control unit is configured to short-circuit the output terminal of the generator for a predetermined time period within such a range that current will not become excessively large by driving the switching unit when the engine speed is low before starting the synchronous operation of the generator so as to flow the current from the generator.

2. The turbo charger generator according to claim 1, wherein the target DC current value is set such that the output DC voltage value of the converter is maintained at a preset target DC voltage value.

3. The turbo charger generator according to claim 1, wherein the rotor rotation angle estimation unit is configured to calculate the rotor magnetic flux based on an output AC current of the generator.

4. The turbo charger generator according to claim 2, wherein the rotor rotation angle estimation unit is configured to calculate the rotor magnetic flux based on an output AC current of the generator.

* * * * *